(12) United States Patent
Guilloux et al.

(10) Patent No.: US 12,405,486 B2
(45) Date of Patent: Sep. 2, 2025

(54) METHOD OF GENERATING VIRTUAL SURFACE DATA OF A PROGRESSIVE ADDITION LENS

(71) Applicant: Essilor International, Charenton-le-Pont (FR)

(72) Inventors: Cyril Guilloux, Charenton le Pont (FR); Gilles Le Saux, Charenton le Pont (FR); Olivier Roussel, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 865 days.

(21) Appl. No.: 17/416,259

(22) PCT Filed: Dec. 9, 2019

(86) PCT No.: PCT/EP2019/084255
§ 371 (c)(1),
(2) Date: Jun. 18, 2021

(87) PCT Pub. No.: WO2020/126621
PCT Pub. Date: Jun. 25, 2020

(65) Prior Publication Data
US 2022/0075209 A1 Mar. 10, 2022

(30) Foreign Application Priority Data

Dec. 20, 2018 (EP) ..................................... 18306775

(51) Int. Cl.
*G02C 7/06* (2006.01)
*G02C 7/02* (2006.01)
(52) U.S. Cl.
CPC ............. *G02C 7/068* (2013.01); *G02C 7/028* (2013.01)

(58) Field of Classification Search
CPC ................................ G02C 7/028; G02C 7/068
(Continued)

(56) References Cited

U.S. PATENT DOCUMENTS

| | | | | |
|---|---|---|---|---|
| 6,199,983 B1 * | 3/2001 | Kato | ...................... | G02C 7/028 351/159.42 |
| 6,318,859 B1 * | 11/2001 | Baudart | ................. | G02C 7/025 351/159.42 |

(Continued)

FOREIGN PATENT DOCUMENTS

| | | |
|---|---|---|
| CN | 103988116 A | 8/2014 |
| CN | 107077008 A | 8/2017 |

(Continued)

OTHER PUBLICATIONS

International Search Report and Written Opinion issued Feb. 28, 2020 in PCT/EP2019/084255 filed Dec. 9, 2019.

(Continued)

*Primary Examiner* — Zachary W Wilkes
(74) *Attorney, Agent, or Firm* — Oblon, McClelland, Maier & Neustadt, L.L.P.

(57) ABSTRACT

A method includes acquiring prescription data including an addition value. The method includes generating virtual surface data of a progressive addition lens for a further operation of surfacing of a lens blank, the operation of surfacing being configured to transform the lens blank into a surfaced lens satisfying the prescription data. The generating virtual surface data includes selecting a virtual base surface in a virtual base surface database, the selection being independent of the prescribed addition value, processing the selected virtual base surface according to the prescribed addition value to obtain a modified virtual base surface, selecting a virtual adjusting surface in a virtual adjusting surface database at least on the basis of a value of a parameter relative to the modified virtual base surface, and combining the (Continued)

modified virtual base surface and the selected virtual adjusting surface to form a virtual progressive adjusted surface.

16 Claims, 4 Drawing Sheets

(58) Field of Classification Search
USPC ........................................ 351/159.42, 159.75
See application file for complete search history.

(56) References Cited

U.S. PATENT DOCUMENTS

| | | | | |
|---|---|---|---|---|
| 6,948,816 B2* | 9/2005 | Yamamoto | ............. | G02C 7/061 |
| | | | | 351/159.75 |
| 7,150,527 B2* | 12/2006 | Meron | .................... | G02C 7/028 |
| | | | | 351/159.75 |
| 7,427,134 B2* | 9/2008 | Bourdoncle | ........... | G02C 7/061 |
| | | | | 351/159.42 |
| 2003/0048408 A1* | 3/2003 | Yamamoto | ............. | G02C 7/028 |
| | | | | 351/159.06 |
| 2006/0050235 A1* | 3/2006 | Meron | .................... | G02C 7/028 |
| | | | | 351/159.42 |
| 2007/0121063 A1* | 5/2007 | Bourdoncle | ........... | G02C 7/061 |
| | | | | 351/159.42 |
| 2010/0041318 A1 | 2/2010 | Schneider et al. | | |
| 2010/0079722 A1 | 4/2010 | Guilloux et al. | | |
| 2010/0283966 A1 | 11/2010 | Colas et al. | | |
| 2012/0218510 A1 | 8/2012 | Kato et al. | | |
| 2013/0335700 A1 | 12/2013 | Watanabe | | |
| 2014/0354944 A1 | 12/2014 | Guillot et al. | | |

FOREIGN PATENT DOCUMENTS

| | | |
|---|---|---|
| DE | 10 2007 007 006 A1 | 8/2008 |
| EP | 1 950 601 A1 | 7/2008 |
| EP | 2 028 527 A1 | 2/2009 |
| EP | 2 492 740 A2 | 8/2012 |
| EP | 2 667 242 A1 | 11/2013 |
| WO | WO 2006/018829 A2 | 2/2006 |
| WO | WO 2013/087925 A1 | 6/2013 |
| WO | WO 2015/173379 A1 | 11/2015 |

OTHER PUBLICATIONS

Combined Chinese Office Action and Search Report issued Oct. 20, 2022 in Chinese Patent Application No. 201980084047.1 (with unedited computer generated English Translation), 22 pages.
European Office Action issued Dec. 20, 2022 in European Patent Application No. 18 306 775.0, 5 pages.

* cited by examiner

| ADJ SURF | RMS (m$^{-1}$) | COEFF ZERNI |
|---|---|---|
| ADJ SURF 1 | [0 ; 0,24] | $^p\alpha_1^1 ; {}^p\alpha_5^3$ |
| ADJ SURF 2 | ]0,24 ; 0,36] | $^i\beta_4^4 ; {}^i\beta_5^1 ; {}^p\beta_6^2$ |
| ⋮ | ⋮ | ⋮ |

FIG. 5

METHOD OF GENERATING VIRTUAL SURFACE DATA OF A PROGRESSIVE ADDITION LENS

FIELD OF THE INVENTION

The invention relates to the field of industrial processes to manufacture ophthalmic lenses, and more particularly progressive addition lenses. More specifically, the invention relates to methods and systems of generating virtual surface data of a progressive addition lens for a further operation of surfacing of a lens blank.

BACKGROUND OF THE INVENTION

In general, a spectacle lens is specifically manufactured to satisfy an ophthalmic prescription. The prescription includes different information such as a sphere value, a cylinder value and an addition, also called addition power. Indeed, when a wearer suffers from presbyopia in particular, it is necessary that the lens manufactured on the basis of the wearer's prescription provide an addition, i.e. a power difference between a zone of the lens intended for near vision, which corresponds to a lower part of the lens, and a zone of the lens intended for distant vision, which corresponds to a upper part of the lens.

Moreover, to facilitate the adaptation of the wearer's eye to the power change between the far-vision zone and the near-vision zone, the lens generally has a continuous power variation along a meridian line connecting a near-vision reference point located in the near-vision zone and a far-vision reference point located in the far-vision zone. Such a lens is a progressive lens or a multifocal lens.

Furthermore, to reduce the complexity of the manufacture of the spectacle lenses, it is now common to manufacture upstream semi-finished lenses, that is to say lenses whose only one of the surfaces is already finished and machined. In general, the finished surface of a semi-finished lens is the front surface. The semi-finished lenses are then stored. When a new ophthalmic prescription is acquired, the most suited semi-finished lens to satisfy this prescription is chosen and it is then sufficient to machine the back surface. The back surface is therefore specific to the wearer and is machined according to the prescription. In addition, the use of semi-finished lenses makes it possible to increase the lenses manufacturing speed.

Computer methods of generating virtual back surface are therefore an important issue. Many of the current processes use a database that provides usable virtual surfaces for generating lens back surfaces.

Nevertheless, such databases require large storage capacities. Indeed, the databases are called based not only on a sphere value and a cylinder value, but also on the basis of the addition value, which explains why these databases must have significant capabilities and offer some diversity in their available designs.

The present invention seeks to improve the situation.

SUMMARY OF THE INVENTION

The present invention provides a method, implemented using a processing module, comprising:
acquiring prescription data including at least an addition value;
generating virtual surface data of a progressive addition lens for a further operation of surfacing of a lens blank, said operation of surfacing being configured to transform the lens blank into a surfaced lens satisfying the prescription data, said generating virtual surface data comprising:
selecting a virtual base surface in a virtual base surface database storing at least one virtual progressive base surface, said selection being independent of the prescribed addition value;
processing the selected virtual base surface according to the prescribed addition value to obtain a modified virtual base surface;
selecting a virtual adjusting surface in a virtual adjusting surface database storing a plurality of virtual adjusting surfaces at least on the basis of a value of a parameter relative to the modified virtual base surface; and
combining the modified virtual base surface and the selected virtual adjusting surface to form a virtual progressive adjusted surface.

Since the virtual base surface database is not called based on the basis of the addition value, significant capabilities are not required. The method thus makes it possible to save space and storage resources without compromising quality. Moreover, the use of a virtual adjusting surface for the correction of the modified base surface improves quality and optical performances of the manufactured progressive addition lens.

According to an embodiment, the prescription data further include a sphere value and a cylinder value, and the virtual base surface database stores only one virtual base surface so that the selected virtual base surface is always the same regardless of the prescribed sphere value and the prescribed cylinder value.

According to an aspect, the virtual adjusting surface is selected in the virtual adjusting surface database only on the basis of the value of the parameter relative to the modified virtual base surface.

In such an embodiment, the necessary storage resources of the virtual base surface database are considerably reduced since only one virtual surface is stored in the virtual base surface database. The step of processing the virtual base surface according to the prescribed addition value to obtain a modified virtual base surface allows compensating the reduced choice.

Alternatively, according to another embodiment, the prescription data further include a sphere value and a cylinder value, and the virtual base surface database stores a plurality of virtual base surfaces. The virtual base surface is selected on the basis of the prescribed sphere value and the prescribed cylinder value.

According to an aspect, the virtual adjusting surface is selected in the virtual adjusting surface database also on the basis of the prescribed sphere value and the prescribed cylinder value.

In this particular embodiment, more storage resources are necessary for the virtual base surface database and the latter presents a greater diversity. On the other hand, the selected virtual base surface is more adapted to the prescription, particularly in the case where the prescription includes other information than the addition power. This embodiment is thus particularly adapted for wearer suffering from astigmatism or myopia.

According to an embodiment, the processing of the selected virtual base surface to obtain the modified virtual base surface includes transforming altitudes of points of the virtual base surface according to the prescribed addition value.

According to an embodiment, the value of the parameter relative to the modified virtual base surface is calculated as a function of minimum and maximum radii of curvature at a plurality of points of said modified virtual base surface.

According to an aspect, this function is a root mean square.

According to an aspect, each virtual adjusting surface stored in the virtual adjusting surface database is associated to a root mean square values range, the respective ranges of the virtual adjusting surfaces not overlapping two-by-two.

The virtual adjusting surfaces make it possible to correct the inaccuracies due to the fact that the base surface is selected independently of its addition. Here again, the addition is not taken into account to select the virtual adjusting surface so that large storage capacities are not necessary for the virtual adjusting surface database, and the latter can then be dimensioned accordingly.

According to an embodiment, each virtual adjusting surface is stored in the virtual adjusting surface database in the form of a set of at least one weighting coefficient so that the corresponding virtual adjusting surface is a linear combination of at least one Zernike polynomial respectively weighted by the at least one weighted coefficient.

The limitation in term of complexity of the Zernike polynomials allows accurately defining a virtual adjusting surface. Indeed, each Zernike polynomial of a linear combination of Zernike polynomials defining a virtual adjusting surface allows converging iteratively to the virtual adjusting surface to be modeled. Moreover, the Zernike polynomials are defined on a disc and thus are adapted to define the whole diopter optical surface, here a back surface of a progressive addition lens.

According to an embodiment, the virtual generated surface data of the progressive addition lens are virtual back surface data.

According to an aspect, the method further comprises selecting a semi-finished lens in a semi-finished lens database on the basis of the prescribed sphere value and the prescribed cylinder value, the semi-finished lens having a finished front surface and an unfinished back surface and being destined to a further operation of surfacing of the unfinished back surface on the basis of the virtual generated surface data.

According to another aspect, each virtual progressive base surface stored in the virtual base surface database corresponds to a virtual back progressive surface so that the virtual progressive adjusted surface formed from the combination of the virtual base surface with the virtual adjusting surface is a virtual progressive back surface. The prescription data further include a sphere value and a cylinder value and the method further comprises:

generating a virtual sphero-toric surface on the basis of the prescribed sphere value, the prescribed cylinder value and the finished front surface of the selected semi-finished lens; and combining the virtual progressive adjusted surface with the virtual sphero-toric surface to form a final virtual progressive back surface.

According to another aspect, each virtual progressive base surface stored in the virtual base surface database corresponds to a virtual front progressive surface so that the virtual progressive adjusted surface formed from the combination of the virtual base surface with the virtual adjusting surface is a virtual progressive front surface, the method further comprising:

performing a reversing operation to transform said virtual progressive front surface into a virtual reversed progressive adjusted surface;

generating a virtual sphero-toric surface on the basis of the prescribed sphere value, the prescribed cylinder value and the finished front surface of the selected semi-finished lens;

combining the virtual reversed progressive adjusted surface with the virtual sphero-toric surface to form a final virtual progressive back surface.

The virtual sphero-toric surface is directed to allow the expected back surface of the progressive addition lens to exhibit desired astigmatism correction performance According to another aspect, the method further comprises:

generating a virtual target lens whose virtual target front surface is said virtual progressive adjusted surface and whose virtual target back surface is a virtual target sphero-toric surface determined based on prescription data and virtual front surface; and optimizing the final virtual progressive back surface using said virtual target lens in order to reach target values generated by analysis of the virtual target lens.

According to another aspect, the finished front surface of each semi-finished lens stored in the semi-finished lens database does not provide any addition value, the selected virtual base surface being processed to obtain a modified virtual base surface providing the prescribed addition value.

Conversely, according to another aspect, the finished front surface of each semi-finished lens stored in the semi-finished lens database provides an addition value, the selected virtual base surface being processed to obtain a modified virtual base surface providing an addition value corresponding to the difference between the prescribed addition value and the addition provided by the finished front surface of the selected semi-finished lens.

In such an embodiment, the surface lens to manufacture provides a progression, and thus an addition value, on each of front and back surfaces. This kind of lenses is also called "dual-add lens". Of course, from a semi-finished lens to another, the addition value provided by the finished front surface may be different. As a consequence, processing the virtual base surface may be less restrictive since a part of the prescribed addition value to provide is already provided by the front surface of the future surfaced lens.

The present invention also relates to a computer program comprising instructions destined to be executed by a processor for the implementation of the method described above.

Finally, the present invention further concerns a system comprising an apparatus for generating virtual surface data of a progressive addition lens for a further operation of surfacing of a lens blank, said operation of surfacing being configured to transform the lens blank into a surfaced lens satisfying a prescription. The apparatus comprises a processing module configured to:

acquire prescription data including at least an addition value;

select a virtual base surface in a virtual base surface database storing at least one virtual progressive base surface, said selection being independent of the prescribed addition value;

process the selected virtual base surface according to the prescribed addition value to obtain a modified virtual base surface;

select a virtual adjusting surface in a virtual adjusting surface database storing a plurality of virtual adjusting surfaces at least on the basis of a value of a parameter relative to the modified virtual base surface; and combine the modified virtual base surface and the selected virtual adjusting surface to form a virtual progressive adjusted surface.

BRIEF DESCRIPTION OF THE DRAWINGS

Other features and advantages of the invention will become apparent from the following description provided for indicative and non-limiting purposes, with reference to the accompanying drawings, wherein.

DETAILED DESCRIPTION OF THE INVENTION

Figure 1:
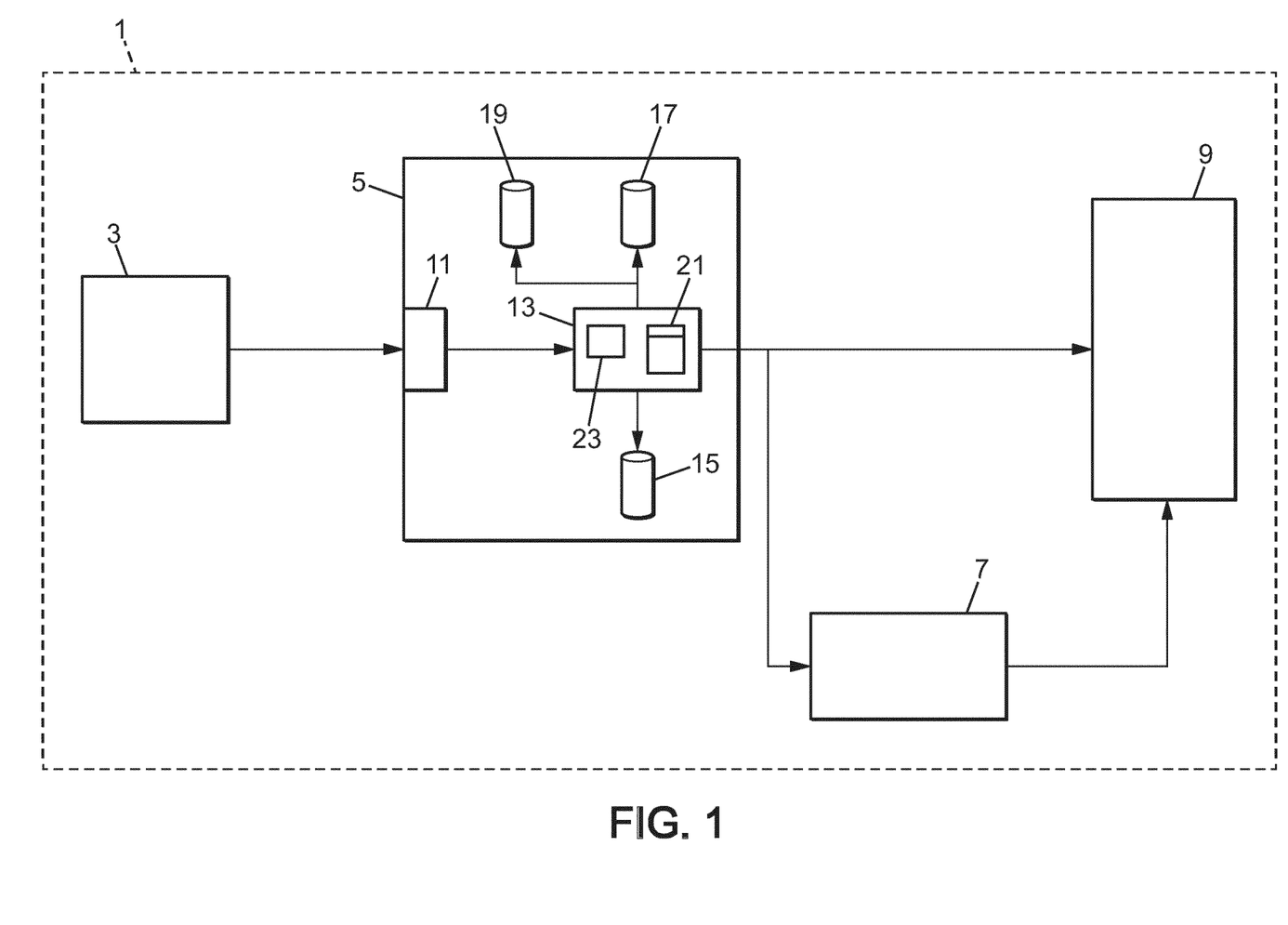
FIG. 1 illustrates a system according to the invention.

FIG. 1 illustrates a system 1 according to the invention. The system 1 is adapted to manufacture a progressive addition lens on the basis of a prescription, and more particularly prescription data.

Figure 2A:
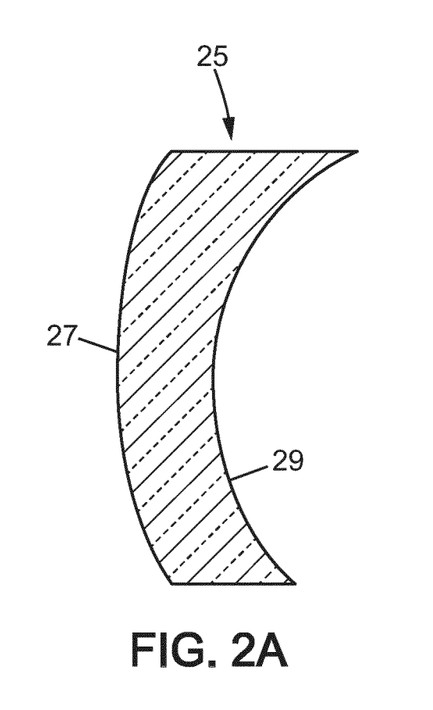
FIG. 2A and FIG. 2B respectively illustrate a sectional view of a progressive addition lens and a progressive front surface of such a progressive addition lens.

A sectional view of a progressive addition lens 25 is illustrated in FIG. 2A. The progressive addition lens 25 comprises a front surface 27 and a back surface 29. The front surface 27 corresponds to the furthest surface of the progressive addition lens 25 from the wearer's eye when the latter is wearing the progressive addition lens 25, and more exactly the glasses comprising the progressive addition lens 25. Conversely, the back surface 29 corresponds to the surface closest of the progressive addition lens to the wearer's eye when the latter is wearing the progressive addition lens 25. In other words, the back surface is the surface positioned on the side of the wearer's eye. FIG. 1 illustrates a system 1 according to the invention. The system 1 is adapted to manufacture a progressive addition lens on the basis of a prescription, and more particularly prescription data.

A progressive addition lens such as the progressive addition lens 25 illustrated in FIG. 2A comprises at least one progressive surface. In other words, at least one of the front surface 27 and the back surface 29 is progressive.

In the context of the invention, it is considered that the back surface 29 is a progressive surface. A progressive back surface is illustrated in FIG. 2B detailed hereinafter.

Figure 2B:
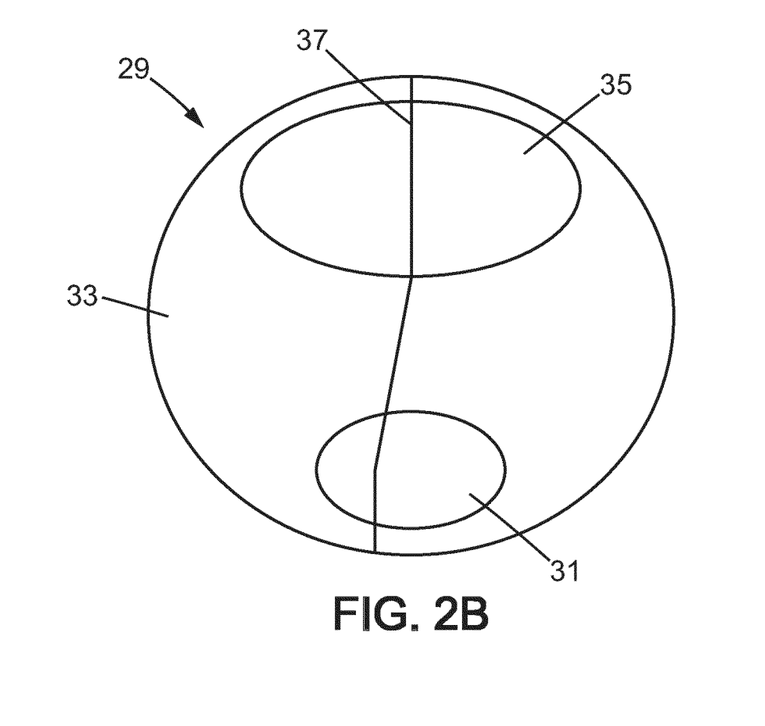

FIG. 2B illustrates a progressive back surface, for instance the progressive back surface 29 of the progressive addition lens 25 previously described in reference to FIG. 2A.

The progressive back surface 29 comprises a near-vision zone 31, a progressive zone 33, also called intermediate zone 33, and a far-vision zone 35. The near-vision zone 31 is located in the lower part of the progressive back surface 29 when the wearer is wearing the progressive addition lens 25. The near-vision zone is the zone of the progressive back surface 29 destined to be used when the wearer is watching an object close to him or her. Conversely, the far-vision zone 35 is located the upper part of the progressive back surface 29. The far-vision zone is the zone of the progressive back surface 29 destined to be used when the wearer is watching a distant object. The progressive zone 33 is located between the near-vision zone 31 and the far-vision zone 35.

As illustrated in FIG. 2B, a meridian line 37 connects the near-vision zone 31 and the far-vision zone 35 through the progressive zone 33. One of the specific features of a progressive surface such as the progressive back surface 29 is that the latter provides an addition power. In other words, there is a power difference between a far-vision reference point (not illustrated here) located in the far-vision zone and near-vision reference point (not illustrated here) located in the near-vision reference zone. Moreover, the power varies continuously at least along the meridian line 37 between the near-vision zone 31 and the far-vision 35. Such a feature facilitates the adaptation of the wearer's eye when it passes from a distant object to a close object and vice versa.

As illustrated in FIG. 1, the system 1 comprises an ordering side 3, an apparatus 5 for generating data of a progressive addition lens, a physical lens blank storage 7 and a manufacturing side 9.

The ordering side 3 is adapted to generate and provide a prescription, and more exactly prescription data to the apparatus 5. Typically, the ordering side 3 may be a computer interface allowing a professional in the medical field of ophthalmology to input data in order to generate prescription data based on the diagnosis of a patient having eye deficiencies such as myopia, presbyopia or astigmatism for instance. Such an interface can furthermore make it possible to transmit the prescription data to the apparatus 5 in order to manufacture lenses adapted specifically for the patient. The prescription data include at least an addition value. The prescription data include for instance a sphere value, a cylinder value and axis and an addition value. The set of prescription data constitutes the prescription. More generally, the skilled person understands here that the ordering side 3 is adapted to generate prescription data for producing lenses for a patient.

According to an embodiment, the prescription data are translated into optical targets to reach for each gaze direction.

The apparatus 5 is adapted to generate data of a progressive addition lens for a further operation of surfacing of a lens blank. The operation of surfacing is configured to transform the lens blank into a surfaced lens satisfying a prescription. In the specifications hereinafter, it is considered that the data generated by the apparatus 5 are virtual back surface data of a desired back surface progressive addition lens. However, the skilled person understands that, conversely, the data generated by the apparatus 5 may be virtual front surface data of a desired front surface progressive addition lens.

As illustrated in FIG. 1, the apparatus 5 comprises a human-machine interface 11, a processing module 13, a semi-finished lens database 15, a virtual base surface database 17 and a virtual adjusting surface database 19.

The human-machine interface 11 is adapted for acquiring prescription data included in a prescription provided by the ordering side 3. The human-machine interface 11 is further adapted for an operator to interact with the apparatus 5, advantageously for inputting prescription data needed for the operation of the apparatus 5. Of course, the skilled person understands that it is also possible that the prescription data are transmitted directly from the ordering side 3 to the apparatus 5 without the intervention of an operator being necessary.

The human-machine interface 11 is further adapted to transmit the virtual back surface data to the manufacturing side 9.

The processing module 13 is adapted to generate virtual back surface data of a progressive addition lens on the basis of the prescription data provided by the ordering side 3. In other words, the inputs of the processing module 13 are the prescription data included in the prescription whereas the outputs are at least virtual back surface data. The operations of the processing module 13 are described in more detail hereinafter in the description with reference to FIGS. 3 and 4.

The processing module 13 comprises a memory 21 and a processor 23.

The memory 21 is configured to store various programs which may be required for the apparatus 5 to operate. In particular, in the context of the invention, the memory 21 is configured to store a computer program which includes instructions whose execution by the processor 23 causes the method of generating virtual back surface data of a progressive addition lens according to the invention described below to be implemented.

The semi-finished lens database 15 is adapted to store semi-finished lenses. More exactly, it should be understood here that the semi-finished lens database 15 is adapted to store information related on semi-finished lenses so that, as explained below, an information related on a semi-finished lens stored in the semi-finished lens database 15 can be associated in the physical lens blank storage 7 with the corresponding physical semi-finished lens. A semi-finished lens in the context of the semi-finished lens database 15 is thus virtual.

A semi-finished lens is a lens whose only one surface is finished whereas the other surface is unfinished. In other words, only one among the front surface and the back surface of the semi-finished lens is already machined and surfaced. In general, the finished surface of a semi-finished lens is the front surface. The manufacture of semi-finished lenses whose only the front surface is finished allows reducing the complexity of the manufacture of the spectacle lenses. When a new ophthalmic prescription is acquired, the most suited semi-finished lens to satisfy this prescription is chosen and it is then sufficient to machine the back surface. The back surface is therefore specific to the wearer and is machined according to the prescription. In addition, the use of semi-finished lenses makes it possible to increase the lenses manufacturing speed.

In other words, the semi-finished lens database 15 is adapted to store virtual front surfaces so that each virtual front surface is associated to an already manufactured semi-finished lens whose front surface is finished and corresponds to the virtual front surface.

The semi-finished lens database 15 is coupled to the processing module 13. Indeed, according to an embodiment, the processing module 13 is adapted to select a semi-finished lens in the semi-finished lens database 15. More particularly, the processing module 13 is adapted to select a virtual front surface corresponding to an already manufactured semi-finished lens whose virtual front surface corresponds to the selected virtual front surface. The corresponding manufactured semi-finished lens is destined to a further operation of surfacing of the unfinished back surface so that the back surface corresponds to the final virtual progressive back surface generated by the apparatus 5.

According to an embodiment, the finished surface of each semi-finished lens stored in the semi-finished lens database 15 provides an addition value. Of course, in such an embodiment, the semi-finished lens database 15 may be configured such that, from a semi-finished lens to another, the addition value provided by the finished front surface may be different.

Conversely, according to another embodiment, the finished surface of each semi-finished surface stored in the semi-finished lens database 15 does not provide any addition value.

The virtual base surface database 17 is adapted to store at least one virtual progressive base surface. The virtual base surface database 17 is also coupled to the processing module 13. Indeed, the processing module 13 is adapted to select a virtual progressive base surface in the virtual base surface database 17 independently of the prescribed addition value. In other words, if two prescriptions differ only by their prescribed addition values, the same virtual base surface is selected in the virtual base surface database 17. The skilled person thus understands here that the addition value is not an input of the virtual base surface database 17, the latter being not callable by the addition value.

Regarding the functioning of the virtual base surface database 17, at least two embodiments must be distinguished.

According to an embodiment, the virtual base surface database 17 stores only one virtual base surface, also called for instance universal surface. In other words, the prescription data including a sphere value and a cylinder value additionally to the addition value, the virtual base surface selected by the processing module 13 is always the same regardless of the prescribed sphere value, the prescribed cylinder value and the prescribed addition value. There is no strictly speaking selection since the virtual base surface database 17 stores only one virtual base surface.

Alternatively, according to another embodiment, the virtual base surface database 17 stores a plurality of virtual base surfaces. In this embodiment, the prescription data including a sphere value and a cylinder value additionally to the addition value, the virtual base surface is selected by the processing module 13 on the basis of the prescribed sphere value and the prescribed cylinder value. As previously explained, the prescribed addition value is not taken into account by the processing module 13 to select the virtual base surface. In other words, each virtual base surface stored in the virtual base surface database 17 is associated or characterized by a pair including a sphere value and a cylinder value.

It should be noted here that, whatever the embodiment, all the virtual base surfaces stored in the virtual base surface database 17 are progressive. As previously explained, the processing module 13 is adapted to select a virtual progressive base surface in the virtual base surface database 17 independently of the prescribed addition value. Consequently, even if the virtual base surfaces stored in the virtual base surface database 17 are progressive and have a different addition value from one to another, the addition values are not taken into consideration to select a virtual base surface. Moreover, all the virtual base surfaces stored in the virtual base surface database 17 may have the same addition value. For example, in this case, this addition value is equal to 1 $m^{-1}$. Usually, the addition value is expressed in diopter ($\delta$).

Furthermore, according to an embodiment, each virtual base surface stored in the virtual base surface database 17 is associated to a refractive index. The refractive index is relative to a particular material further used to manufacture the desired progressive addition lens.

In addition, according to an embodiment, each virtual progressive base surface stored in the virtual base surface database 17 corresponds to a virtual back progressive surface. Alternatively, each virtual base surface stored in the virtual base surface database 17 is a virtual front surface.

Still regarding the virtual base surfaces, the processing module 13 is adapted to process the selected virtual base surface according to the prescribed addition value to obtain a modified virtual base surface. For instance, the obtained modified virtual base surface provides at least a part of the prescribed addition value. Advantageously, the processing module 13 is adapted to process the selected virtual base surface to obtain a modified virtual base surface providing the prescribed addition value For instance, the processing of the selected virtual base surface to obtain the modified virtual base surface includes transforming altitudes of points of the virtual base surface according to the prescribed addition value.

As previously explained, the virtual base surface is selected in the virtual base surface database 17 independently of the prescribed addition value. The prescribed addition value is provided, for instance, by performing a transformation of altitudes of points of the virtual base surface. In order to improve the future optical performances of the progressive addition lens to be manufactured, it is particularly advantageous to combine the modified base surface with an adjusting surface in particular to converge to prescription data such as the desired sphere and the desired cylinder.

Figure 5:
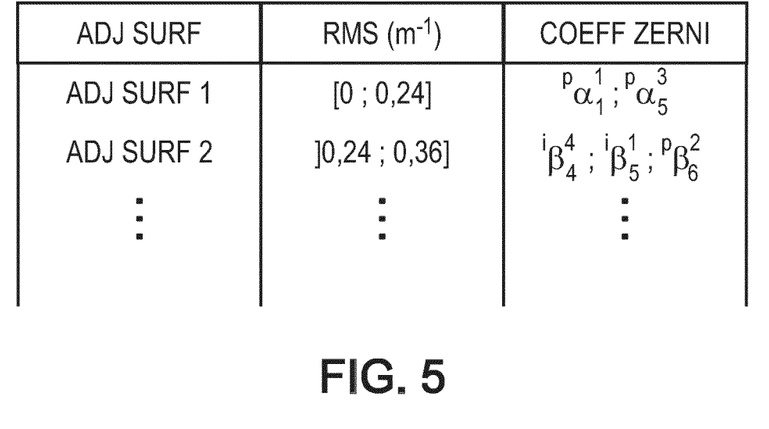
FIG. 5 illustrates a virtual adjusting surface database.

FIG. 5 illustrates the virtual adjusting surface database 19. The virtual adjusting surface database 19 is adapted to store a plurality of virtual adjusting surfaces.

Typically, the virtual adjusting surfaces do not correspond to progressive surfaces and thus do not have an addition. The virtual adjusting surfaces are configured to be combined with the modified virtual base surface previously selected and processed by the processing module 13.

The processing module 13 is thus further adapted to select a virtual adjusting surface in the virtual adjusting surface database 19 at least on the basis of a value of a parameter relative to the modified virtual base surface. Typically, the processing module 13 is adapted to calculate the value of the parameter from the modified base surface.

As explained above, at least two different embodiments must be considered for the functioning of the virtual base surface database 17 and thus for the selection of the virtual base surface by the processing module 13.

According to an embodiment, the virtual base surface database 17 stores only one virtual base surface and the virtual base surface selected by the processing module 13 is always the same regardless of the prescribed sphere value, the prescribed cylinder value and the prescribed addition value. In this embodiment, the virtual adjusting surface is selected in the virtual adjusting surface database 17 only on the basis of the value of the parameter relative to the modified virtual base surface.

According to another embodiment, the virtual base surface database 17 stores a plurality of virtual base surfaces and the virtual base surface selected by the processing module 13 is selected on the basis of the prescribed sphere value and the prescribed cylinder value. In this embodiment, the virtual adjusting surface is selected in the virtual adjusting surface database 19 on the basis of the prescribed sphere value and the prescribed cylinder value in addition to the value of the parameter relative to the modified virtual base surface.

In the example illustrated in FIG. 5, the virtual adjusting surface database 19 is such that the virtual adjusting surface is selected only on the basis of the value of the parameter relative to the modified virtual base surface.

According to an embodiment, each virtual adjusting surface is mapped in the virtual adjusting surface database 19 with a range, or an interval, of parameter's value. In other words, the processing module 13 is adapted to select the virtual adjusting surface whose associated parameter values range includes the value of the parameter calculated for the previously selected and processed modified virtual base surface.

According to an embodiment, the parameter relative to the modified virtual base surface is a function of minimum and maximum radii of curvature at a plurality of points of said modified virtual base surface.

For instance, the parameter relative to the modified virtual base surface is a function of mean sphere power values and/or cylindrical power values at a plurality of points of said modified virtual base surface.

The mean sphere power at a point of the modified virtual base surface is defined by the following formula:

$$S = \frac{n-1}{2}\left(\frac{1}{R_1} + \frac{1}{R_2}\right)$$

where:
S is the mean sphere power at a point of the modified virtual base surface;
n is the refractive index of the lens material (here the modified virtual base surface is only virtual, the lens material of the lens blank, i.e. the semi-finished lens used for the further operation of surfacing is thus considered); and.
$R_1$ and $R_2$ are respectively minimum and maximum radii of curvature on the considered point, expressed in meters (m).

The cylindrical power at a point of the modified virtual base surface is defined by the following formula:

$$C = (n-1)\left|\frac{1}{R_1} - \frac{1}{R_2}\right|$$

Where: C is the cylindrical power at a point of the modified virtual base surface.

For instance, the function is a root mean square.

In such an embodiment, the parameter relative to the modified virtual base surface is the root mean square of mean sphere power at a plurality of points of the modified virtual base surface. The value of the parameter for a given modified virtual base surface is thus defined as follows:

$$RMS_{mean\ sphere} = \sqrt{\frac{1}{N}\sum_{i=1}^{N} sph(x_i; y_i)^2}$$

where:
RMS mean sphere is the value of the root mean square of mean sphere power at N points having coordinates ($x_i$; $y_i$), i being an integer comprised between 1 and N;
$sph(x_i; y_i)$ is the mean sphere power at the point having coordinates ($x_i$; $y_i$).

Alternatively, the parameter relative to the modified virtual base surface is the root mean square of cylindrical power values at a plurality of points of said modified virtual base surface. The value of the parameter for a given modified virtual base surface is thus defined as follows:

$$RMS_{cylindrical} = \sqrt{\frac{1}{N}\sum_{i=1}^{N} cyl(x_i; y_i)^2}$$

where:
- $RMS_{cylindrical}$ is the value of the root mean square of cylindrical power at N points having coordinates ($x_i$; $y_i$), i being an integer comprised between 1 and N;
- $cyl(x_i; y_i)$ is the cylindrical power at the point having coordinates ($x_i$; $y_i$).

The parameter relative to the modified virtual base surface may also be a combination of a root mean square of mean sphere power at a plurality of points of the modified virtual base surface and a root mean square of cylindrical power values at a plurality of points of said modified virtual base surface.

Alternatively, this function may for example be an arithmetic mean, a geometric mean, a harmonic mean, a weighted mean or any other known mean.

As previously explained, each virtual adjusting surface is mapped in the virtual adjusting surface database 19 with a range of parameter's value. In the embodiment according to which the parameter is the root mean square of mean sphere power at a plurality of points of the modified virtual base surface, it is thus clear that each virtual adjusting surface stored in the virtual adjusting surface database 19 is associated to a root mean square values range.

Advantageously, the respective ranges of the virtual adjusting surfaces not overlap two-by-two. In the example illustrated in FIG. 5, the parameter relative to the modified virtual base surface is the root mean square of mean sphere power at a plurality of points of the modified virtual base surface. As illustrated, a first virtual adjusting surface ADJ SURF 1 stored in the virtual adjusting surface database 19 is mapped, or associated, with the root mean square values range [0; 0.24]. A second virtual adjusting surface ADJ SURF 2 is mapped, or associated, with the root mean square values range [0.24; 0.36]. Of course, the skilled person understands that, advantageously, other virtual adjusting surfaces are stored so as to cover a wider range of values.

Regarding now the storage of the plurality of virtual adjusting surfaces in the virtual adjusting surface database 19, and as illustrated in FIG. 5, each virtual adjusting surfaces is stored in the virtual adjusting surface database 19 in the form of a set of at least one weighting coefficient so that the corresponding virtual adjusting surface is a linear combination of at least one Zernike polynomial respectively weighted by the at least one weighted coefficient.

The Zernike polynomials are defined as follows:

$$^pZ_n^m(\rho,\theta) = R_n^m(\rho) \cdot \cos(m\theta)$$

$$^iZ_n^m(\rho,\theta) = R_n^m(\rho) \cdot \sin(m\theta)$$

where:
- $^pZ_n^m$ and $^iZ_n^m$ are respectively even and uneven Zernike polynomials, m and n being integers verifying: $0 \leq m \leq n$;
- $\rho$ and $\theta$ are respectively the radius and the polar angle forming the polar coordinates of a point;
- $R_n^m$ is a polynomial defined as follows:

$$R_n^m(\rho) = \sum_{k=0}^{n-m}(-1)^k \frac{(2n-m-k)!}{k!(n-k)!(n-m-k)!}\rho^{2n-m-2k}$$

A polynomial base, the Zernike polynomials, is thus defined. As explained above, the virtual adjusting surfaces are not virtual progressive surfaces and thus do not have an addition power. The virtual adjusting surfaces are therefore not as complex as progressive surfaces and present slight altitude variations. The virtual adjusting surfaces may thus be modeled with Zernike polynomials. The limitation in term of complexity of the Zernike polynomials allows accurately defining a virtual adjusting surface. Indeed, each Zernike polynomial of a linear combination of Zernike polynomials defining a virtual adjusting surface allows converging iteratively to the virtual adjusting surface to be modeled. Moreover, the Zernike polynomials are defined on a disc and thus are adapted to define the whole diopter optical surface, here a back surface of a progressive addition lens.

In the present case, the first adjusting surface ADJ SURF 1 is associated in the virtual adjusting surface database 19 to a set of two weighting coefficients referenced as $^p\alpha_1^1$ and $^p\alpha_5^3$. The first virtual adjusting surface ADJ SURF 1 thus corresponds to the linear combination of the Zernike polynomials $^pZ_1^1$ and $^pZ_5^3$ respectively weighted by $^p\alpha_1^1$ and $^p\alpha_5^3$. In other words:

$$ADJ\ SURF1 = {}^p\alpha_1^1 \cdot {}^pZ_1^1 + {}^p\alpha_5^3 \cdot {}^pZ_5^3$$

The second adjusting surface ADJ SURF 2 is associated in the virtual adjusting surface database 19 to a set of three weighting coefficients referenced as $^i\beta_4^4$, $^i\beta_5^1$, and $^p\beta_6^2$. The second virtual adjusting surface ADJ SURF 2 thus corresponds to the linear combination of the Zernike polynomials $^iZ_4^4$, $^iZ_5^1$ and $^pZ_6^2$ respectively weighted by $^i\beta_4^4$, $^i\beta_5^1$ and $^p\beta_6^2$. In other words:

$$ADJ\ SURF2 = {}^i\beta_4^4 \cdot {}^iZ_4^4 + {}^i\beta_1^5 \cdot {}^pZ_6^2$$

In the previous example, only two Zernike polynomials are used to define the first adjusting surface ADJ SURF 1 and only three Zernike polynomials are used to define the second ADJ SURF 2. However, the skilled person understands here that the definition of a typical virtual adjusting surface may require a lot more Zernike polynomials.

Alternatively, other polynomials, like B-splines for instance, may be used to define and store the virtual adjusting surfaces in the virtual adjusting surface database 19.

In FIG. 1, the semi-finished lens database 15, the virtual base surface database 17 and the virtual adjusting surface database 19 are illustrated as distinct databases. However, it should be understood that only one database may be used for storing the different virtual surfaces detailed above.

The physical lens blank storage 7 is adapted to physically store a plurality of lens blanks. As previously explained, the lens blanks used in the context of the present invention are advantageously semi-finished lenses, i.e. lenses whose only one surface is machined. The physical lens blank storage 7 is further adapted to receive data corresponding to the semi-finished lens selected by the processing module 13 in the semi-finished lens database 15 from the apparatus 5.

Upon receiving data corresponding to the semi-finished lens selected by the processing module 13, the corresponding physical lens blank, i.e. the corresponding semi-finished lens, is sought in the physical lens blank storage 7. For instance, the physical lens blank storage 7 comprises means for automatically seeking and getting the corresponding semi-finished lens. Alternatively, the corresponding semi-finished lens is sought and got by a human, for instance someone working in the physical lens blank storage 7.

Optionally, if the corresponding semi-finished lens is not available in the physical lens blank storage 7, the latter also comprises means for transmitting an alert to the apparatus 5 to inform it that the semi-finished lens corresponding to the semi-finished lens selected is not available. In such a situation, the semi-finished lens may be transmitted to another physical lens blank storage similar to the physical lens blank storage illustrated in FIG. 1. Alternatively, a new semi-finished lens is selected by the processing module 13 in the semi-finished lens database and is then transmitted to the physical lens blank storage 7.

The physical lens blank storage 7 is further adapted to send the semi-finished lens to the manufacturing side 9.

The manufacturing side 9 is adapted to receive virtual back surface data from the apparatus 5. The manufacturing side 9 is further adapted to receive a lens blank from the physical lens blank storage 7. According to an embodiment, the manufacturing side 9 is more specifically adapted to receive a semi-finished lens from the physical lens blank storage 7.

Furthermore, the manufacturing side 9 is adapted to manufacture a progressive addition lens on the basis of the virtual back surface data received from the apparatus 5. According to an embodiment, the manufacturing side 9 is adapted to machine the unfinished back surface of the semi-finished lens received from the physical lens blank storage 7 so that the back surface, after machining, corresponds to the virtual back surface data for satisfying the prescription generated in the ordering side 3.

The manufacturing side 9 also comprises devices and machine-tools for the operations of blocking, cribbing, surfacing, polishing and all other necessary operations for manufacturing a progressive addition lens satisfying the prescription. Starting from the semi-finished lens sent from the physical lens blank storage 7, the needed operations are performed in order to machine the back surface of the semi-finished lens in order to obtain a finished back surface complying with the virtual back surface data transmitted by the apparatus 5.

Figure 3:
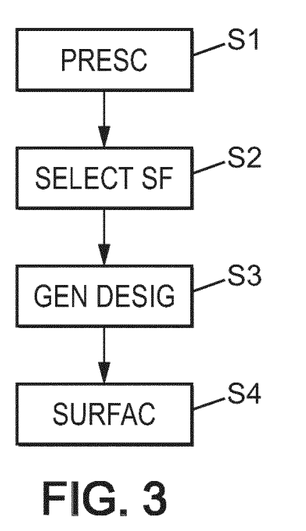
FIG. 3 illustrates a method according to the invention.

A manufacture of a progressive addition lens is detailed hereinafter in reference to FIG. 3.

In the context of the invention, typically, a patient with vision problems is diagnosed by a professional in the medical field of ophthalmology. The patient has eye deficiencies such as myopia, presbyopia or astigmatism for instance. The professional in the medical field of ophthalmology uses the ordering side 3 to input data in order to generate prescription data based on the diagnosis of the patient. In the ordering side 3, a prescription is generated. The prescription includes prescription data comprising an addition value. The prescription data may also comprise a sphere value and a cylinder value.

The prescription data are then transmitted to the apparatus 5.

In a first step S1, the apparatus 5 acquires prescription data including at least an addition value. As previously explained, the prescription data may also comprise a sphere value and a cylinder value. The prescription data are for instance acquired by the apparatus 5 through the human-machine interface 11. The prescription data may be inputted by an operator interacting with the human-machine interface 11. Alternatively, the prescription data are transmitted directly from the ordering side 3 to the apparatus 5 without the intervention of an operator being necessary.

In a second step S2, the apparatus 5 selects a semi-finished lens in the semi-finished lens database 15 on the basis of the prescribed sphere value and the prescribed cylinder value. As explained above, the semi-finished lens selected in the semi-finished lens database 15 is virtual. The corresponding semi-finished lens has a finished front surface and an unfinished back surface. The semi-finished lens is destined to a further operation of surfacing of the unfinished back surface.

According to an embodiment, the finished surface of the semi-finished lens does not provide any addition value. However, according to another embodiment, the finished surface of the semi-finished lens provides an addition value. Both cases will be discussed below.

In a third step S3, virtual back surface data of the progressive addition lens are generated. This step will be detailed hereinafter in reference to FIG. 4.

In a fourth step S4, the information related on semi-finished lens selected by the processing module 13 in the semi-finished lens database 15 is transmitted to the physical lens blank storage 7. In the physical lens blank storage 7, the corresponding physical semi-finished lens is obtained. As previously explained, the semi-finished lens may be sought and got by a professional working in the physical lens blank storage. Alternatively, the semi-finished lens blank may be automatically sought and got. The semi-finished lens is then transmitted to the manufacturing side 9.

Furthermore, the virtual back surface data generated by the apparatus 5, and more particularly by the processing module 13, are transmitted to the manufacturing side 9.

In the manufacturing side 9, a progressive addition lens is manufactured in order to satisfy the prescription data received from the ordering side 3. To this end, the unfinished back surface of the semi-finished lens transmitted by the physical lens blank storage 7 is surfaced on the basis of the virtual back surface data. In other words, the semi-finished lens is machined so that the back surface, after machining, corresponds to the virtual back surface data and thus satisfies the prescription. During this step, many devices and machine-tools may be utilized in order to manufacture the aimed progressive addition lens. The operations performed in the manufacturing side 9 for manufacturing the progressive addition lens whose back surface complies with the virtual back surface data are for instance operations of blocking, cribbing, surfacing, polishing and all other necessary operations.

Figure 4:
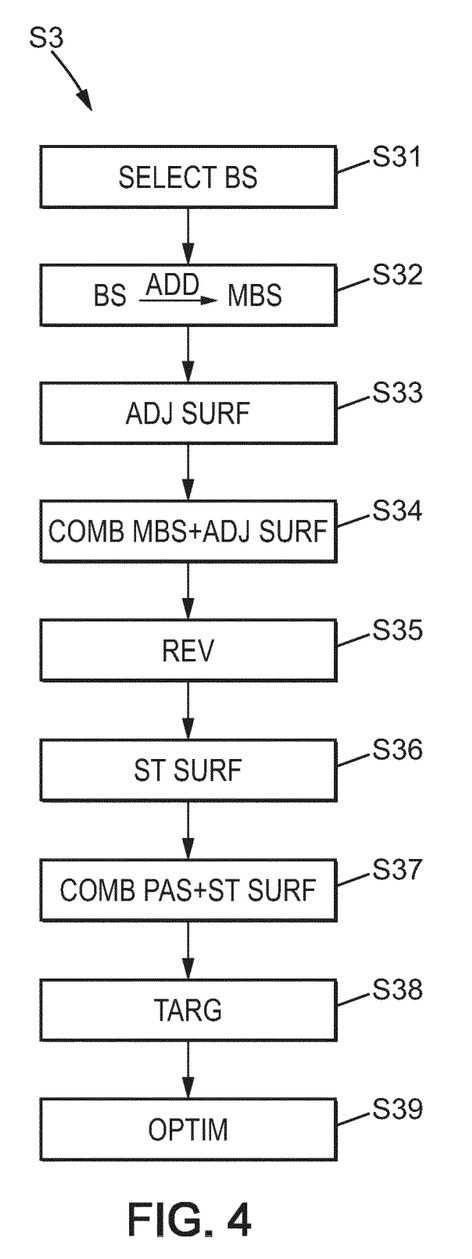
FIG. 4 illustrates a step of generating virtual surface data of a progressive addition lens of the method illustrated in FIG. 3 according to the invention.

In reference now to FIG. 4, the step S3 of generating virtual back surface data of the progressive addition lens per se is detailed hereinafter.

In a step S31, the processing module 13 selects a virtual base surface in the virtual base surface database 17 storing at least one virtual progressive base surface. The selection of the virtual base surface performed in the apparatus 5 does not depend on the prescribed addition value included in the prescription data.

As previously explained, two distinguished embodiments are considered.

According to an embodiment, only one virtual base surface is stored in the virtual base surface database 17. In other words, the virtual base surface selected by the processing module is always the same regardless of the prescribed sphere value, the prescribed cylinder value and the prescribed addition value. There is no strictly speaking selection since the virtual base surface database 17 stores only one virtual base surface. So, whatever the prescription, the same virtual base surface is always selected during this step. The virtual base surface stored in the virtual base surface database 17 is a virtual progressive surface and thus has a default addition value. This addition value is equal to 1 δ for instance.

Alternatively, according to another embodiment, a plurality of virtual base surfaces is stored in the virtual base surface database 17. Furthermore, the virtual base surface selected by the processing module 13 is selected on the basis of the prescribed sphere value and the prescribed cylinder value. However, as previously explained, the prescribed addition value is not taking into account by the processing value 13 to select the virtual base surface. In other words, each virtual base surface stored in the virtual base surface database 17 is associated or characterized by a pair including a sphere value and a cylinder value. The processing module 13 thus selects a virtual base surface on the basis of the prescribed sphere value and the prescribed cylinder value.

All the virtual base surfaces stored in the virtual base surface database 17 are progressive. As previously explained, the selection of the virtual base surface is independent of the prescribed addition value, so that all the virtual base surfaces stored in the virtual base surface database 17 may have the same addition value since the respective addition values of the virtual base surfaces stored in the virtual base surface design database 17 are not taken into consideration to select a virtual base surface. For instance, in the embodiment in which all the virtual base surfaces have the same addition value, this addition value may be equal to 1 δ. Not only is the selection of the virtual base surface independent of the prescribed addition value, but this selection is also independent of the respective addition values of the stored virtual base surfaces.

At the end of this first step 31, a virtual base surface having a default addition value is thus selected.

In a step S32, the selected virtual base surface is processed according to the prescribed addition value to obtain a modified virtual base surface. Advantageously and more precisely, during this step, the selected virtual base surface is processed to obtain a modified virtual base surface providing the prescribed addition value. The nuance between a modified virtual base surface obtained by processing the virtual base surface according to the prescribed addition value and a modified virtual base surface providing the prescribed addition value is based on the nature of the semi-finished lens.

Indeed, as previously explained, there are two possibilities concerning the semi-finished lens: According to an embodiment, the finished surface of the semi-finished lens does not provide any addition value. Hence, in such an embodiment, the prescribed addition value of the surfaced lens to manufacture will be provided only by the surface that was previously the unfinished surface of the semi-finished lens, i.e. the back surface. In this embodiment, it is thus necessary to process, during the step S32, the selected virtual base surface to obtain a modified virtual base surface providing the prescribed addition value.

Conversely, according to another embodiment, the finished surface of the semi-finished lens provides an addition value. Hence, in such an embodiment, the prescribed addition value of the surfaced lens to manufacture will be provided by both surfaces of the surfaced lens, i.e. the surface that was already finished and already provided an addition value and the surface that was previously the unfinished surface. In this embodiment, the selected virtual base surface is thus processed according to the prescribed addition value, but not so that the modified virtual base surface provides the whole prescribed addition value since a part of this prescribed addition value will be provided by the finished surface of the semi-finished lens used to manufacture the surfaced lens. For instance, the virtual base surface is processed to obtain a modified base surface providing an addition value corresponding to the difference between the prescribed addition value and the addition value already provided by the finished surface of the selected semi-finished lens.

In the literature, the surfaced lens whose both surfaces provide an addition value are often called "dual-add lenses".

Here, we thus use a general formulation according to which "the selected virtual base surface is processed according to the prescribed addition value to obtain a modified virtual base surface" that covers the embodiment in which the whole prescribed addition value will be provided only by one surface of the future surfaced lens and the embodiment in which the prescribed addition value will be provided by both surfaces of the future surfaced lens. Indeed, "according to the prescribed addition value" can mean that the modified virtual base surface provides the prescribed addition value, but also can mean that the modified virtual base surface provides only a part of the prescribed addition value and not necessarily the whole prescribed addition value.

Hereinafter, we consider rather the case in which, during the step S32, the selected virtual base surface is processed to obtain a modified virtual base surface providing the prescribed addition value.

As explained above, the selected virtual base surface has a default addition value since the virtual base surface has an addition value. This step thus aims to modify the virtual base surface so that the modified virtual base surface obtained has the prescribed addition value or at least a part of the prescribed addition value.

According to an embodiment, the processing of the selected virtual base surface to obtain the modified virtual base surface includes transforming altitudes of points of the virtual base surface according to the prescribed addition value. Such a transformation of the virtual base surface to obtain the modified virtual base surface is detailed hereinafter according to an embodiment.

Assuming that the virtual base surface is defined in a three-dimensional space using three axes X, Y and Z forming an orthogonal spatial system, each point of the virtual base surface is characterized by three coordinates, each one being related to an axis of the orthogonal spatial system. An origin O of such an orthogonal spatial system can be defined. A point P of the virtual progressive surface may be noticed P(X, Y, Z). The virtual base surface may thus be modeled with a surface equation as follows:

$$Z = S(X, Y)$$

where:
X, Y and Z are the coordinates of a given point P of the virtual base surface; and
S is the surface equation of the virtual base surface.

Then, a regular sampling of the plane OXY (i.e. the plane comprising O and containing the axes X and Y) is defined. This regular sampling can be seen as a set of points $P_{i,j}$ of the plane OXY, each point $P_{i,j}$ having coordinates $(X_i, Y_j)$. For each point $P_{i,j}$ of the plane OXY, a plane tangent to the virtual base surface can be define at the orthogonal projection of the considered point on the virtual base surface. For each tangent plane, three curvatures of the virtual base surface along three particular directions of the corresponding tangent plane can be determined and written as follows:

$$C_h = \frac{r}{\xi(1+p^2)}$$

$$C_v = \frac{t}{\xi(1+q^2)}$$

-continued $$C_d = \frac{2s + r + t}{\xi(2 + (p+q)^2)}$$

with $\xi = \sqrt{1 + p^2 + q^2}$ where: p, q, r, s and t are the Monge's notations defined as follows:

$$p = \frac{\partial S}{\partial x}$$

$$q = \frac{\partial S}{\partial y}$$

$$r = \frac{\partial^2 S}{\partial x^2}$$

$$s = \frac{\partial^2 S}{\partial x \partial y}$$

$$t = \frac{\partial^2 S}{\partial y^2}$$

As previously explained, this step S32 is performed to process the virtual base surface in order to obtain a modified virtual base surface providing the prescribed addition value, or at least a part of the prescribed addition value, that can be different from the default addition value of the selected virtual base surface. Similarly to the virtual base surface, the wanted modified virtual base surface may be defined in the previous orthogonal spatial system formed by the three axes X, Y and Z and having the origin O. A point P' of the virtual progressive surface may be noticed P'(X, Y, Z). The modified virtual base surface may thus be modeled with a surface equation as follows:

$$Z = S'(X, Y)$$

where:
X, Y and Z are the coordinates of a given point P' of the modified virtual base surface; and
S' is the surface equation of the modified virtual base surface.

Considering the regular sampling of the plane OXY previously evoked, three curvatures of the modified virtual base surface along the three particular directions of the plane tangent to the modified virtual base surface at the orthogonal projection of the considered point on the modified virtual base surface can be determined and written as follows:

$$C'_h = \frac{r'}{\xi'(1 + p'^2)}$$

$$C'_v = \frac{t'}{\xi'(1 + q'^2)}$$

$$C'_d = \frac{2s' + r' + t'}{\xi'(2 + (p' + q')^2)}$$

with $\xi' = \sqrt{1 + p'^2 + q'^2}$ where: p', q', r', s' and t' are the Monge's notations for the modified virtual base surface modeled by the above surface equation Z=S'(X,Y).

Furthermore, the three curvatures $C'_h$, $C'_h$ and $C'_d$ are respectively defined by applying an affine transformation to the three curvatures of the virtual base surface. In other words:

$C'_h = \alpha C_h + b$ $C'_v = \alpha C_v + b$ $C'_d = a C_d + b$ where: a and b are calculated in function of the spherical power values respectively at a near-vision reference point and a far-vision reference point of the selected virtual base surface and in function of the wanted spherical power values respectively at a near-vision reference point and a far-vision reference point of the desired modified virtual base surface.

According to an embodiment, the parameters a and b are calculated as follows:

$$a = \frac{sph'_{NV} - sph'_{FV}}{sph_{NV} - sph_{FV}}$$

$$b = sph'_{FV} - a sph_{FV}$$

where:
$sph_{NV}$ and $sph_{FV}$ are the spherical power values respectively at the near-vision reference point and the far-vision reference point of the virtual base surface; and
$sph'_{NV}$ and $sph'_{FV}$ are the spherical power values respectively at the near-vision reference point and the far-vision reference point of the modified virtual base surface.

Then, the first partial derivatives of the sought surface equation S' of the desired modified virtual base surface, i.e. the quantities p' and q', are fixed to zero in order to determine the expressions of the second partial derivatives of the surface equation S' of the modified virtual base surface, i.e. the quantities r', s' and t'.

The first partial derivatives of the surface equation S' can then be determined by applying numerical integration as follows:

$$p'(x, y) = \int_0^x r'(\zeta, 0) d\zeta + \int_0^y s'(x, \delta) d\delta + p'(0, 0)$$

$$q'(x, y) = \int_0^x s'(\zeta, y) d\zeta + \int_0^y t'(0, \delta) d\delta + q'(0, 0)$$

To numerically calculate these integrals, different classical mathematical solutions are possible. For instance, a Simpson type method is used. Because of convergence, the points where the magnitude is greater than $\sqrt{p'^2 + q'^2}$ are temporarily removed. These points are set aside and the derivatives will no longer be calculated in this phase of the calculation step. Finally, to determine the sought surface equation S' of the modified base surface equation, numerical integration is calculated using the first derivatives p' and q' as follows:

$$S'(x, y) = \int_0^x p'(\zeta, 0) d\zeta + \int_0^y q'(x, \delta) d\delta + S'(0, 0)$$

Of course, the skilled person understands that step 32 may be differently performed to obtain the desired modified virtual base surface. For instance, starting from the selected base surface, target values for sphere and cylinder are determined by applying an affine law. Then, the surface equation the closest to the targets values calculated is computed by surface optimization.

In a step S33, the processing module 13 selects a virtual adjusting surface in the virtual adjusting surface database 19 storing a plurality of virtual adjusting surfaces at least on the basis of a value of a parameter relative to the modified virtual base surface. In other words, during step S33, the processing module 13 calculates a value of a parameter from the modified virtual base surface and selects a virtual adjusting surface in the virtual adjusting surface database 19 on the basis of the calculated value. Such a value is calculated each time it is necessary to select a virtual adjusting surface for a modified virtual base surface. The virtual adjusting surface is not a virtual progressive surface and thus does not have an addition value.

As previously explained, the functioning of the virtual adjusting surface database 19 depends on the functioning of the virtual base surface database 17.

In the embodiment according to which the virtual base surface database 17 stores only one virtual base surface and the virtual base surface selected by the processing module 13 is always the same regardless of the prescribed sphere value, the prescribed cylinder value and the prescribed addition value, the processing module 13 selects a virtual adjusting surface only on the basis of the value of the parameter relative to the modified virtual base surface. FIG. 5 illustrates this embodiment of the virtual adjusting surface database 19.

In the alternative embodiment according to which the virtual base surface database 17 stores a plurality of virtual base surfaces and the virtual base surface is also selected on the basis of the prescribed sphere value and the prescribed cylinder value, the virtual adjusting surface is selected in the virtual adjusting surface database 19 also on the basis of the prescribed sphere value and the prescribed cylinder value in addition to the value of the parameter relative to the modified virtual base surface.

Furthermore, the parameter relative to the modified virtual base surface is for instance a function of mean sphere power and/or cylindrical power values at a plurality of points of the modified virtual base surface. This function is for instance a root mean square. As previously explained, this function may also be an arithmetic mean, a geometric mean, a harmonic mean, a weighted mean or any other known mean. In other words, during this step, a calculation is performed, by the processing module 13 for instance, on the modified base surface to determine the root mean square of mean sphere power or cylindrical power values at a plurality of points of the modified virtual base surface. The value of the root mean square is used to select the appropriate virtual adjusting surface.

In the embodiment illustrated in FIG. 5, each virtual adjusting surface is mapped in the virtual adjusting surface database 19 with a range of parameter's value. The processing module 13 selects the virtual adjusting surface whose associated parameter values range includes the value of the parameter for the previously selected and processed modified virtual base surface. For instance, if the root mean square value calculated on the modified virtual base surface is equal to 0.15, the first adjusting virtual base surface ADJ SURF 1 is selected. If the root mean square value calculated on the modified virtual base surface is equal to 0.32, the second adjusting virtual base surface ADJ SURF 2 is selected. As explained above, in the particular embodiment illustrated in FIG. 5, only the value of the parameter, here the root mean square, relative to the modified virtual base surface is considered. However, in an alternative embodiment, the value of the root mean square is not sufficient to select a virtual adjusting surface, the prescribed sphere value and the prescribed cylinder value are necessary to select the appropriate virtual adjusting surface.

As previously explained, the parameter relative to the modified virtual base surface is for instance a function of minimum and maximum radii of curvature at a plurality of points of the modified virtual base surface. For instance, the parameter relative to the modified virtual base surface is a function of mean sphere power values and/or cylindrical power values at a plurality of points of said modified virtual base surface. In FIG. 5, the parameter is a root mean square of mean sphere power values. However, according to a particular embodiment, the parameter can be a combination of a root mean square of mean sphere power values and of a root mean square of cylindrical values.

In a step S34, the modified virtual base surface and the selected virtual adjusting surface are combined to form a virtual progressive adjusted surface.

As explained above, according to an embodiment, each virtual progressive base surface stored in the virtual base surface database corresponds to a virtual back progressive surface. In such an embodiment, the virtual progressive adjusted surface formed at the end of this step is thus a virtual progressive back surface.

Alternatively, according to another embodiment, each virtual progressive base surface stored in the virtual base surface database 17 corresponds to a virtual front surface. In such an embodiment, the virtual progressive adjusted surface formed at the end of this step from the combination of the virtual base surface with the virtual adjusting surface is a virtual progressive front surface. However, as explained above, in the context of the present invention, the front surface of the selected semi-finished lens is already machined and thus the purpose of the aimed method is to generate a virtual back surface. Steps S35, S38 and S39 described hereinafter specifically concern this particular embodiment.

So, in a step S35, in the embodiment in which the virtual progressive adjusted surface is a virtual progressive front surface, a reversing operation is performed to transform the virtual progressive adjusted surface, which is a virtual front surface, resulting from the combination of the virtual base surface with the progressive adjusting surface, into a virtual reversed progressive back surface.

Conversely, if the virtual progressive adjusted surface is a virtual progressive back surface, the step S35 is not necessary and thus not performed.

In a step S36, a virtual sphero-toric surface is generated on the basis of the prescribed sphere value, the prescribed cylinder value and the finished front surface of the semi-finished lens selected in the semi-finished lens database 15. Such a virtual sphero-toric surface is directed to allow the expected back surface, whose generation is detailed hereinafter, of the progressive addition lens to exhibit desired astigmatism correction performance.

In a step S37, the virtual progressive adjusted surface and the virtual sphero-toric surface are combined to form a final virtual progressive back surface. More specifically, in the particular embodiment in which the step S35 is necessary since the virtual progressive adjusted surface is a virtual progressive front surface, the virtual reversed progressive adjusted surface and the virtual sphero-toric surface are combined to form the final virtual progressive back surface. Conversely, in the embodiment in which the step S35 is not performed since the virtual progressive adjusted surface is a virtual progressive back surface, the virtual progressive adjusted surface and the virtual sphero-toric surface are simply combined to form a final virtual progressive back surface.

Thereafter, the final virtual progressive back surface is considered as a set of a plurality of points, each point being characterized by a set of coordinates. The final virtual progressive back surface is defined in a three-dimensional space using three axes X, Y and Z forming an orthogonal spatial system. In other words, each point of the final virtual progressive back surface is characterized by three coordinates, each one being related to an axis of the orthogonal spatial system. A point P of the final virtual progressive back surface may thus be noticed P(X, Y, Z). In the literature, the coordinate Z is often called altitude or sag.

Using such an orthogonal spatial system, the equation of the final virtual progressive back surface resulting from the combination of the virtual (reversed) progressive adjusted surface with the virtual sphero-toric surface may be an addition of the virtual (reversed) progressive adjusted surface and the virtual sphero-toric surface. In other words:

$$Z(X,Y)=Z_{PAS}(X,Y)+Z_{ST}(X,Y)$$

where:
Z (X,Y) is the altitude, or sag, of a given point P of the final virtual progressive back surface having coordinates X, Y;
$Z_{PAS}(X,Y)$ is the altitude, or sag, of a given point $P_{PAS}$ of the virtual (reversed) progressive adjusted surface having coordinates X, Y; and
$Z_{ST}(X,Y)$ is the altitude, or sag, of a given point $P_{ST}$ of the virtual sphero-toric surface having coordinates X, Y.

Of course, the skilled person understands that other equations or formulae can be used to combine the virtual (reversed) progressive adjusted surface and the virtual sphero-toric surface.

The following steps are performed in the particular embodiment evoked above in which the step S35 is necessary since the progressive adjusted surface obtained in step S34 from the combination of the virtual base surface with the virtual adjusting surface performed is a virtual progressive front surface.

In a step S38, the processing module 13 generates a virtual target lens. As explained above, according to an embodiment, each virtual progressive base surface stored in the virtual base surface database 17 corresponds to a virtual target front surface. In this embodiment, the processing module 13 generates a virtual target lens whose virtual target front surface is the virtual progressive adjusted surface and whose virtual target back surface is a virtual target sphero-toric surface generated on the basis of the prescription data and the virtual target front surface. The virtual target sphero-toric surface generated to carry out this step must not be confused with the virtual sphero-toric surface used in previous step S37 and combined with the virtual (reversed) progressive adjusted surface. In this embodiment, the virtual progressive adjusted surface is a virtual progressive target front surface. This virtual progressive adjusted surface may thus be used to form a virtual target lens.

Optionally, in a step S39, the generated final virtual progressive back surface is optimized using the virtual target lens in order to reach optical targets. For instance, a well-known virtual ray tracing method can be performed by the processing module 13 to iteratively modify the generated final virtual progressive back surface to progressively reach the optical targets.

For performing this virtual ray tracing method, a virtual progressive addition lens is generated so that the virtual font surface of this virtual progressive addition lens is the virtual target front surface of the semi-finished lens selected in the semi-finished lens database 15 while the virtual target back surface of this virtual progressive addition lens is the final virtual progressive back surface generated in step S37. The virtual ray-tracing method is performed in order to generate target values by analysis of the virtual target lens. Target values are typically power values and astigmatism values for all gaze directions.

The final virtual progressive back surface obtained after optimization is then transmitted to the manufacturing side 9.

The above specifications describe the generation of virtual back surface data of a progressive addition lens. However, as explained above, the skilled person understands that, conversely, the method described can be implemented to generate virtual front surface data. To implement such a method, it suffices simply to invert "front surface" and "back surface" in the previously described method. For instance, the semi-finished lens selected in the semi-finished lens database has an unfinished front surface and a finished back surface. Consequently, the reversing operation is performed only in the particular embodiment in which each virtual progressive base surface stored in the virtual base surface database 17 corresponds to a virtual back progressive surface and in which the progressive adjusted surface formed from the combination of the virtual base surface with the virtual adjusting surface is a virtual progressive back surface.

In the previous specifications, it clearly appears that the prescription data are used to generate virtual surface data for a further operation of surfacing a semi-finished lens whose only one surface is already machined. However, other parameters than the prescription data may obviously be taken into consideration and used to generate virtual surface data and to determine the desired progressive addition lens. Typically, such parameters are individual parameters relating to the wearer for whom the progressive addition lens is intended. For instance, parameters concerning the frame can be taken into consideration.

The present invention has several advantages.

Firstly, since the virtual base surface database is not called based on the basis of the addition value, significant capabilities are not required. The method which is the subject matter of the present invention thus makes it possible to save space and storage resources without compromising quality.

In addition, the use of a virtual adjusting surface for the correction of the modified base surface improves quality and optical performances of the manufactured progressive addition lens.

The invention claimed is:

1. A method, comprising:
acquiring prescription data including at least a sphere value, a cylinder value, and an addition value;
generating virtual surface data of a progressive addition lens for a further operation of surfacing of a lens blank, the operation of surfacing being configured to transform the lens blank into a surfaced lens satisfying the prescription data, the generating the virtual surface data comprising:
obtaining a virtual base surface in a virtual base surface database storing at least one virtual progressive base surface so that the virtual base surface is obtained without reference to or reliance upon the prescribed addition value,
processing the selected virtual base surface according to the prescribed addition value to obtain a modified virtual base surface providing at least a part of the prescribed addition value, selecting a virtual adjusting surface in a virtual adjusting surface database storing a plurality of virtual adjusting surfaces at least on the basis of a value of a parameter relative to the modified virtual base surface, and combining the modified virtual base surface and the selected virtual adjusting surface to form a virtual progressive adjusted surface;

selecting a semi-finished lens in a semi-finished lens database on the basis of the prescribed sphere value and the prescribed cylinder value, the semi-finished lens having a first surface which is a finished surface and a second surface which is an unfinished surface; and surfacing the second surface of the semi-finished lens on the basis of the virtual surface data so that the second surface of the semi-finished lens, after the surfacing, corresponds to the virtual progressive adjusted surface, wherein each virtual progressive base surface stored in the virtual base surface database corresponds to a virtual front progressive surface so that the virtual progressive adjusted surface formed from the combination of the virtual base surface with the virtual adjusting surface is a virtual progressive front surface, and the method further comprises:

performing a reversing operation to transform the virtual progressive front surface into a virtual reversed progressive adjusted surface;

generating a virtual sphero-toric surface on the basis of the prescribed sphere value, the prescribed cylinder value and the finished front surface of the selected semi-finished lens; and combining the virtual reversed progressive adjusted surface with the virtual sphero-toric surface to form a final virtual progressive back surface.

2. The method of claim 1, wherein the virtual base surface database stores only one virtual base surface so that the obtained virtual base surface is always the same regardless of the prescribed sphere value and the prescribed cylinder value.

3. The method of claim 2, wherein the virtual adjusting surface is obtained in the virtual adjusting surface database only on the basis of the value of the parameter relative to the modified virtual base surface.

4. The method of claim 1, wherein the virtual base surface database stores a plurality of virtual base surfaces, the virtual base surface being selected on the basis of the prescribed sphere value and the prescribed cylinder value.

5. The method of claim 4, wherein the virtual adjusting surface is selected in the virtual adjusting surface database also on the basis of the prescribed sphere value and the prescribed cylinder value.

6. The method of claim 1, wherein the processing of the selected virtual base surface to obtain the modified virtual base surface includes transforming altitudes of points of the virtual base surface according to the prescribed addition value.

7. The method of claim 1, wherein the value of the parameter relative to the modified virtual base surface is calculated as a function of minimum and maximum radii of curvature at a plurality of points of the modified virtual base surface.

8. The method of claim 7, wherein the function is a root mean square.

9. The method of claim 8, wherein each virtual adjusting surface stored in the virtual adjusting surface database is associated to a root mean square values range, the respective ranges of the virtual adjusting surfaces being mutually exclusive.

10. The method of claim 1, wherein each virtual adjusting surface is stored in the virtual adjusting surface database in the form of a set of at least one weighting coefficient so that the corresponding virtual adjusting surface is a linear combination of at least one Zernike polynomial respectively weighted by the at least one weighted coefficient.

11. The method of claim 1, wherein the virtual generated surface data of the progressive addition lens are virtual back surface data.

12. The method of claim 1, wherein each virtual progressive base surface stored in the virtual base surface database corresponds to a virtual back progressive surface so that the virtual progressive adjusted surface formed from the combination of the virtual base surface with the virtual adjusting surface is a virtual progressive back surface, wherein the prescription data further include a sphere value and a cylinder value, the method further comprising:

generating a virtual sphero-toric surface on the basis of the prescribed sphere value, the prescribed cylinder value and the finished front surface of the selected semi-finished lens; and combining the virtual progressive adjusted surface with the virtual sphero-toric surface to form a final virtual progressive back surface.

13. The method of claim 1, further comprising:

generating a virtual target lens whose virtual target front surface is the virtual progressive adjusted surface and whose virtual target back surface is a virtual target sphero-toric surface determined based on prescription data and virtual front surface; and optimizing the final virtual progressive back surface using the virtual target lens in order to reach target values generated by analysis of the virtual target lens.

14. The method of claim 1, wherein the finished front surface of each semi-finished lens stored in the semi-finished lens database does not provide any addition value, the selected virtual base surface being processed to obtain a modified virtual base surface providing the prescribed addition value.

15. The method of claim 1, wherein the finished front surface of each semi-finished lens stored in the semi-finished lens database provides an addition value, the selected virtual base surface being processed to obtain a modified virtual base surface providing an addition value corresponding to a difference between the prescribed addition value and the addition provided by the finished front surface of the selected semi-finished lens.

16. A system comprising:

an apparatus for generating virtual surface data of a progressive addition lens for a further operation of surfacing of a lens blank, the operation of surfacing being configured to transform the lens blank into a surfaced lens satisfying a prescription, the apparatus comprising processing circuitry configured to:

acquire prescription data including at least a sphere value, a cylinder value, and an addition value, obtain a virtual base surface in a virtual base surface database storing at least one virtual progressive base surface so that the virtual base surface is obtained without reference to or reliance upon the prescribed addition value, process the selected virtual base surface according to the prescribed addition value to obtain a modified virtual base surface providing at least a part of the prescribed addition value, select a virtual adjusting surface in a virtual adjusting surface database storing a plurality of virtual adjusting surfaces at least on the basis of a value of a parameter relative to the modified virtual base surface, and combine the modified virtual base surface and the selected virtual adjusting surface to form a virtual progressive adjusted surface, wherein each virtual progressive base surface stored in the virtual base surface database corresponds to a virtual front progressive surface so that the virtual progressive adjusted surface formed from the combination of the virtual base surface with the virtual adjusting surface is a virtual progressive front surface;

an apparatus configured to:

perform a reversing operation to transform the virtual progressive front surface into a virtual reversed progressive adjusted surface;

generate a virtual sphero-toric surface on the basis of the prescribed sphere value, the prescribed cylinder value and the finished front surface of the selected semi-finished lens; and combine the virtual reversed progressive adjusted surface with the virtual sphero-toric surface to form a final virtual progressive back surface;

wherein the processing circuitry is configured to select a semi-finished lens in a semi-finished lens database on the basis of the prescribed sphere value and the prescribed cylinder value, the semi-finished lens having a first surface which is a finished surface and a second surface which is an unfinished surface; and a device configured to surface the second surface of the semi-finished lens on the basis of the virtual surface data so that the second surface of the semi-finished lens, after being surfaced by the device, corresponds to the virtual progressive adjusted surface.

\* \* \* \* \*